(12) United States Patent
Yang et al.

(10) Patent No.: US 12,463,405 B2
(45) Date of Patent: Nov. 4, 2025

(54) POWER SYSTEM

(71) Applicant: Delta Electronics, Inc., Taoyuan (TW)

(72) Inventors: Shan-Chun Yang, Taoyuan (TW);
Vincent Mark Byrne, Taoyuan (TW);
Wun-Hsin Nian, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 239 days.

(21) Appl. No.: 18/335,623

(22) Filed: Jun. 15, 2023

(65) Prior Publication Data

US 2024/0022048 A1    Jan. 18, 2024

Related U.S. Application Data

(60) Provisional application No. 63/389,588, filed on Jul. 15, 2022.

(30) Foreign Application Priority Data

Mar. 9, 2023    (CN) .......................... 202310223844.1

(51) Int. Cl.
*H02B 1/04*    (2006.01)
*H02B 1/20*    (2006.01)

(52) U.S. Cl.
CPC ................. *H02B 1/04* (2013.01); *H02B 1/20* (2013.01)

(58) Field of Classification Search
CPC ............... H05K 7/1457; H05K 7/1492; G06F 1/188–189; H02B 1/04; H02B 1/056; H02B 1/20; H02B 1/202; H02B 1/205
See application file for complete search history.

(56) References Cited

U.S. PATENT DOCUMENTS

| | | | | |
|---|---|---|---|---|
| 6,122,160 A | * | 9/2000 | Hannula | H02B 1/056 174/68.2 |
| 6,784,783 B2 | | 8/2004 | Scoggin et al. | |
| 6,905,372 B2 | * | 6/2005 | Cabrera | H01R 25/162 361/822 |
| 7,027,293 B2 | * | 4/2006 | Yang | H02B 1/04 361/647 |
| 7,440,262 B2 | * | 10/2008 | Coffey | H02B 1/04 361/728 |

(Continued)

FOREIGN PATENT DOCUMENTS

| CN | 105742964 A | 7/2016 |
|---|---|---|
| CN | 113572030 A | 10/2021 |

(Continued)

OTHER PUBLICATIONS

Office Action and Search Report mailed Oct. 25, 2023 issued in corresponding Taiwan Application No. 112108618.

*Primary Examiner* — Robert J Hoffberg
(74) *Attorney, Agent, or Firm* — MUNCY, GEISSLER, OLDS & LOWE, P.C.

(57) ABSTRACT

A power system is provided, including a power module, a plurality of first electric apparatus safety devices, and a plurality of second electric apparatus safety devices. The first electric apparatus safety devices and second electric apparatus safety devices are arranged along a first direction of the power system. The first electric apparatus safety devices, the second electric apparatus safety devices, and the power module are stacked along a second direction of the power system, wherein the first direction is perpendicular to the second direction.

11 Claims, 12 Drawing Sheets

(56) References Cited

U.S. PATENT DOCUMENTS

| | | | | |
|---|---|---|---|---|
| 8,320,107 B2* | 11/2012 | Coffey | ...................... | H02B 1/04 |
| | | | | 361/627 |
| 8,848,346 B2* | 9/2014 | Johnsen | ................... | H02B 1/32 |
| | | | | 361/644 |
| 10,746,799 B2* | 8/2020 | Smith | ................ | G01R 31/3275 |
| 11,408,939 B2* | 8/2022 | Smith | .................... | H01H 73/06 |
| 11,839,046 B2* | 12/2023 | Yang | .................... | H05K 7/1418 |
| 11,949,214 B2* | 4/2024 | Yu | ......................... | H02B 1/0565 |
| 2009/0154070 A1 | 6/2009 | Coffey et al. | | |
| 2015/0016029 A1 | 1/2015 | Johnsen | | |
| 2025/0038491 A1* | 1/2025 | Preuss | ................. | H05K 7/1487 |

FOREIGN PATENT DOCUMENTS

| | | |
|---|---|---|
| TW | I297560 | 6/2008 |
| TW | I755262 B | 2/2022 |
| WO | WO2020167003 A1 | 8/2020 |

\* cited by examiner

POWER SYSTEM

CROSS REFERENCE TO RELATED APPLICATIONS

This application claims the benefit of U.S. Provisional Application No. 63/389,588, filed Jul. 15, 2022, and China Patent Application No. 202310223844.1, filed Mar. 9, 2023, the entirety of which are incorporated by reference herein.

BACKGROUND OF THE INVENTION

Field of the Invention

The application relates in general to a power system, and in particular, to a power system applied on a telecom power.

Description of the Related Art

The composition of the power distribution panel of an electric apparatus safety device (such as a circuit breaker) in a telecom power system of the prior art is usually held stationary. As a result, the user cannot replace the switch as desired, making it inconvenient. Moreover, current telecom power systems must be thicker (or higher) in order to allow the power distribution panel to be disposed in place. When available space is lacking, it is difficult to dispose the telecom power system. Therefore, how to address the aforementioned problem has become an important issue.

BRIEF SUMMARY OF INVENTION

To address the deficiencies of conventional products, an embodiment of the invention provides a power system, including a power module, a plurality of first electric apparatus safety devices, and a plurality of second electric apparatus safety devices. The first electric apparatus safety devices are arranged along a first direction of the power system, and each of the first electric apparatus safety devices has a first input terminal and a first output terminal. The second electric apparatus safety devices are arranged along the first direction, and each of the second electric apparatus safety devices has a second input terminal and a second output terminal. The first electric apparatus safety devices and the second electric apparatus safety devices are stacked along a second direction of the power system, and the second direction is perpendicular to the first direction. The second electric apparatus safety devices are disposed between the first electric apparatus safety devices and the power module. The first input terminal of each of the first electric apparatus safety devices and the second input terminal of each of the corresponding second electric apparatus safety devices are arranged along the second direction to form a plurality of input sides. The first output terminal of each of the first electric apparatus safety devices and the second output terminal of each of the corresponding second electric apparatus safety devices are arranged along the second direction to form a plurality of output sides. The input sides and the output sides are arranged along the first direction.

In some embodiments, the power system further comprises a bracket, and the first electric apparatus safety devices and the second electric apparatus safety devices are disposed on a first side of the bracket.

In some embodiments, the power system further comprises multiple sets of first power bus assemblies and multiple sets of second power bus assemblies. The first power bus assemblies are connected to the first input terminals and the first output terminals of the first electric apparatus safety devices. The second power bus assemblies are connected to the second input terminals and the second output terminals of the second electric apparatus safety devices. The first power bus assemblies and the second power bus assemblies are disposed on a second side of the bracket, and the second side is opposite to the first side.

In some embodiments, the bracket further comprises a plurality of insulating clamps disposed between the first power bus assemblies and the second power bus assemblies to support and insulate the first power bus assemblies and the second power bus assemblies.

In some embodiments, each power bus in the first power bus assemblies has a terminal insertion port configured to allow the corresponding first input terminal and the corresponding first output terminal to be inserted, and each power bus in the second power bus assemblies has a terminal insertion port configured to allow the corresponding second input terminal and the corresponding second output terminal to be inserted.

In some embodiments, the power system further comprises a tripping detection module disposed on the bracket, and configured to detect whether the first electric apparatus safety devices and the first power bus assemblies have been tripped and detect whether the second electric apparatus safety devices and the second power bus assemblies have been tripped In some embodiments, the bracket comprises a plurality of inner insulating members disposed between a plurality of power buses in the first power bus assemblies and disposed between a plurality of power buses in the second power bus assemblies.

In some embodiments, the bracket comprises a plurality of outer insulating members or a plurality of lateral plates, the outer insulating members or the lateral plates define a plurality of spaces, and the first power bus assemblies and the second power bus assemblies are disposed in the spaces.

In some embodiments, the bracket comprises a plurality of supporting portions, a bottom plate, and a partition. The supporting portions are configured to dispose the first power bus assemblies. The bottom plate is configured to dispose the second power bus assemblies. The partition is connected to the bottom plate and the supporting portions. The partition is disposed between the first electric apparatus safety devices and the first power bus assemblies, and disposed between the second electric apparatus safety devices and the second power bus assemblies. The supporting portions are separated from each other, and separate the first power bus assemblies from the second power bus assemblies.

In some embodiments, the supporting portions have a plurality of grooves, the appearance of the grooves of the supporting portions correspond to the appearance of a plurality of power buses in the first power bus assemblies, the bottom plate has a plurality of grooves, the appearance of the grooves of the bottom plate correspond to the appearance of a plurality of power buses in the second power bus assemblies.

In some embodiments, the first direction is parallel to the directionality of the height of the power module, and the second direction is parallel to the directionality of the width of the power module. In some embodiments, the first direction is parallel to the directionality of the width of the power module, and the second direction is parallel to the directionality of the height of the power module.

Base on the structure of the invention, the user can elastically arrange and/or replace the electric apparatus safety device as required due to the modular design, so that the expandability and the space utilization can be achieved. Moreover, the present disclosure has multiple isolating and supporting designs, the assembled strength and the electrical stability of the device can be confirmed.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the power system and the power distribution panel in the power system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
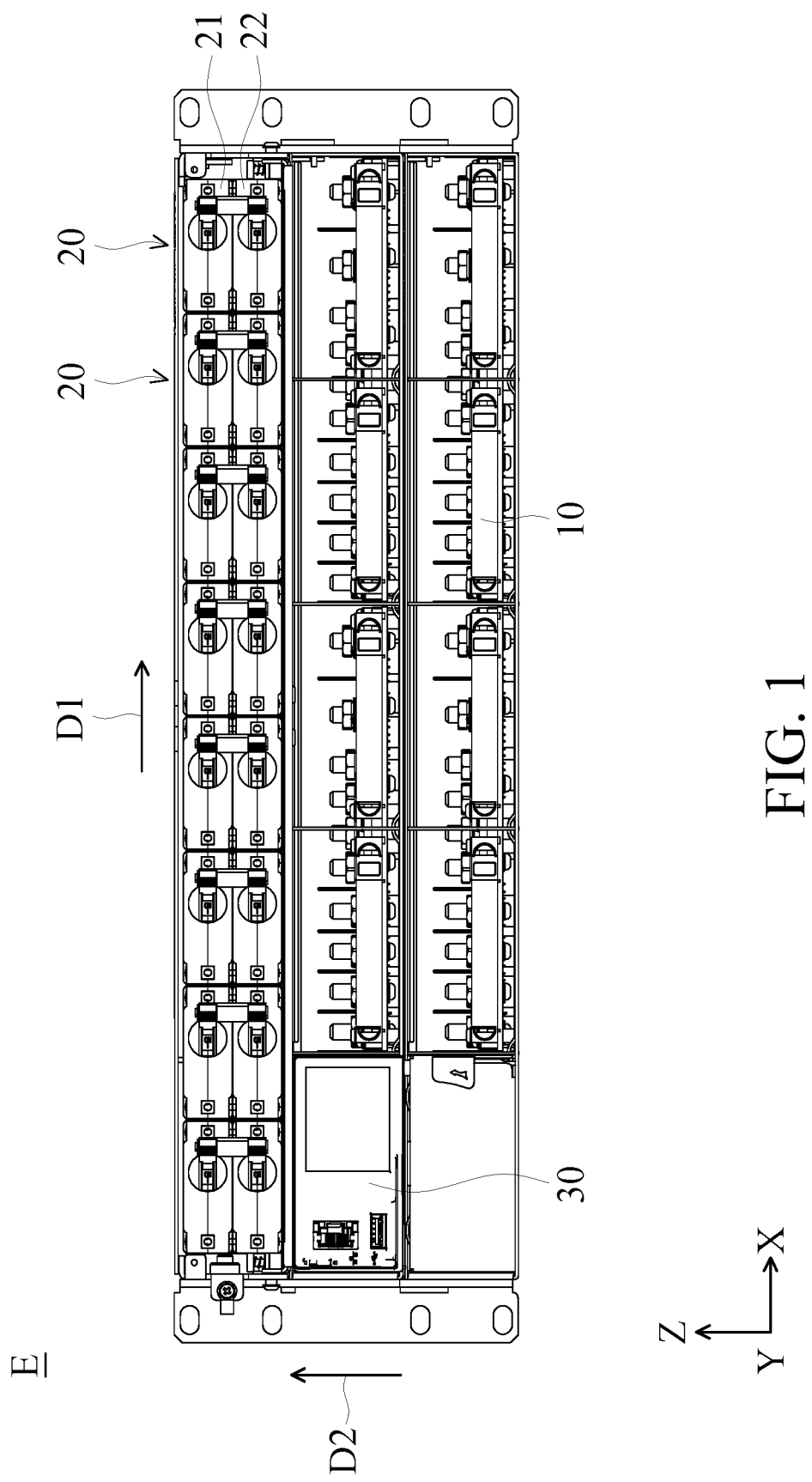
FIG. 1 is a schematic diagram of a power system according to an embodiment of the invention.

As shown in FIG. 1, a power system E in an embodiment of the invention includes a power module 10, a plurality of power distribution panels 20, and a control module 30. In this embodiment, it takes eight power distribution panels 20 as an example. These power distribution panels 20 are disposed on the power module 10, and the power distribution panels 20 can be electrically connected to the power module 10 and the control module 30 via the electric conductors (such as the wires). In this embodiment, the power distribution panels 20 are arranged on the power module 10 along a first direction D1 of the power system E, and the first direction D1 is parallel to the directionality of the width of the power module 10 (i.e. the direction of the X-axis in the figures).

Figure 2:
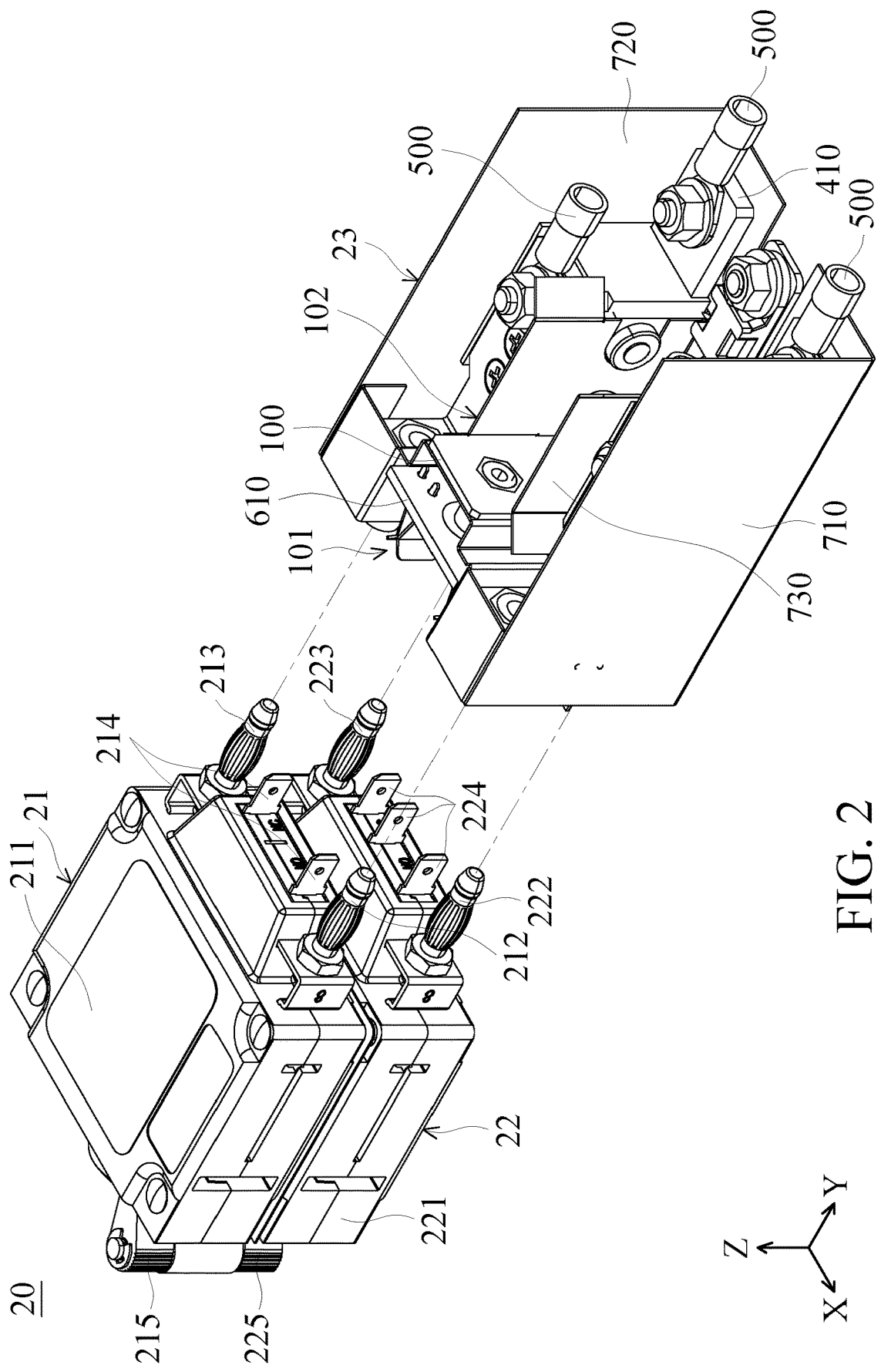
FIG. 2 is a schematic diagram of a power distribution panel according to an embodiment of the invention.

Referring to FIG. 1 and FIG. 2, each of the power distribution panels 20 includes a first electric apparatus safety device 21, a second electric apparatus safety device 22, and a connecting device 23. For example, the first electric apparatus safety device 21 can be a breaker 211, and the breaker 211 includes a first input terminal 212, a first output terminal 213, at least one electrical connecting terminal 214, and a toggle switch 215. The first input terminal 212, the first output terminal 213, and the electrical connecting terminal 214 are disposed on the same side of the breaker 211, and configured to connect the connecting device 23. The toggle switch 215 is disposed on the opposite side of the breaker 211. For example, the toggle switch 215 can be an operation lever configured to open or close the breaker 211. Similarly, the second electric apparatus safety device 22 can be a breaker 221, and the breaker 221 includes a second input terminal 222, a second output terminal 223, at least one electrical connecting terminal 224, and a toggle switch 225. The second input terminal 222, the second output terminal 223, and the electrical connecting terminal 224 are disposed on the same side of the breaker 221, and configured to connect the connecting device 23. The toggle switch 225 is disposed on the opposite side of the breaker 221. For example, the toggle switch 225 can be an operation lever configured to open or close the breaker 221. In this embodiment, the breaker 211 and the breaker 221 can be replaced by a fuse support and/or a jumper device, but it is not limited thereto.

Figure 3:
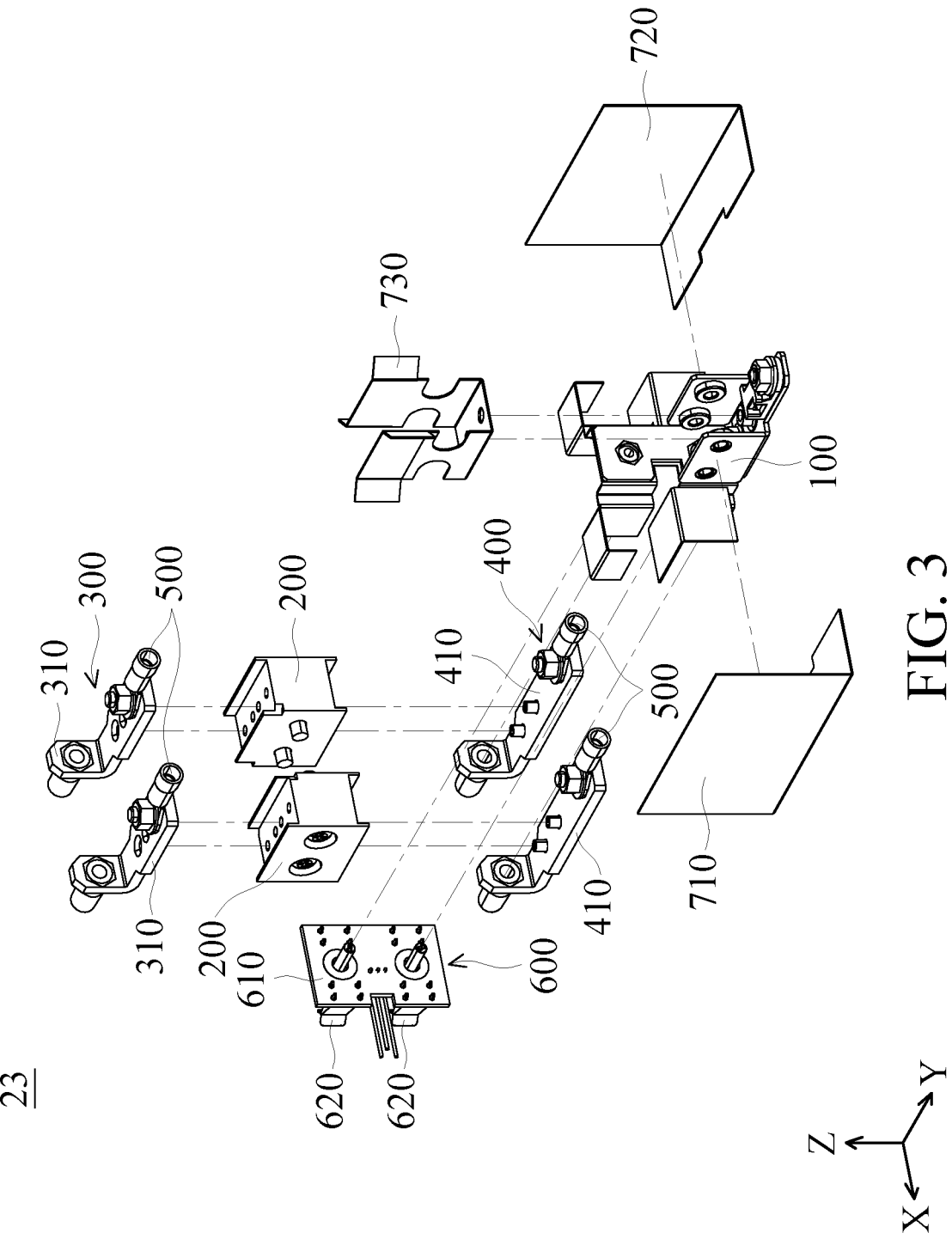
FIG. 3 is an exploded diagram of a connecting device according to an embodiment of the invention.
Figure 4:
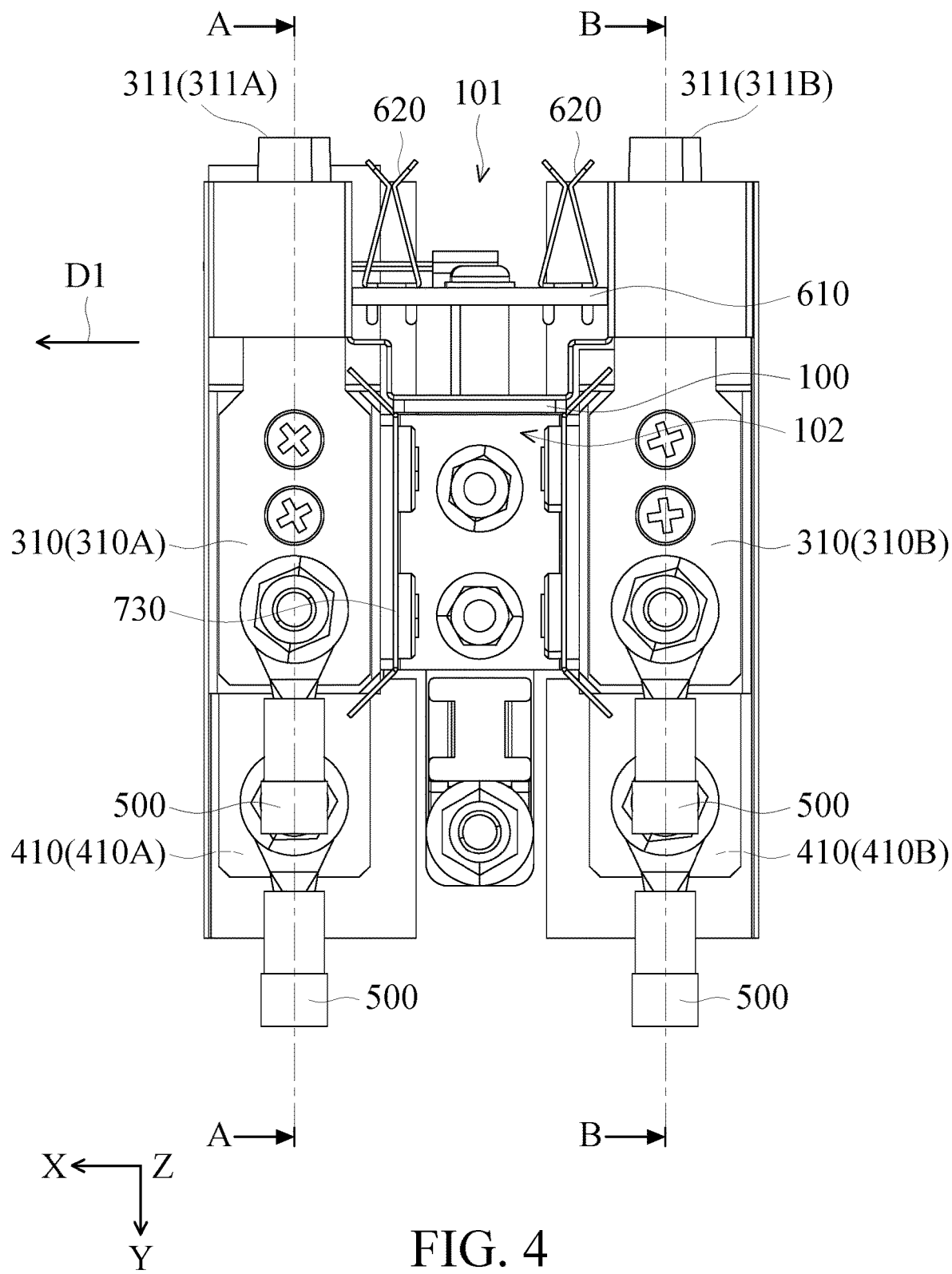
FIG. 4 is a top view of the connecting device according to an embodiment of the invention.
Figure 5:
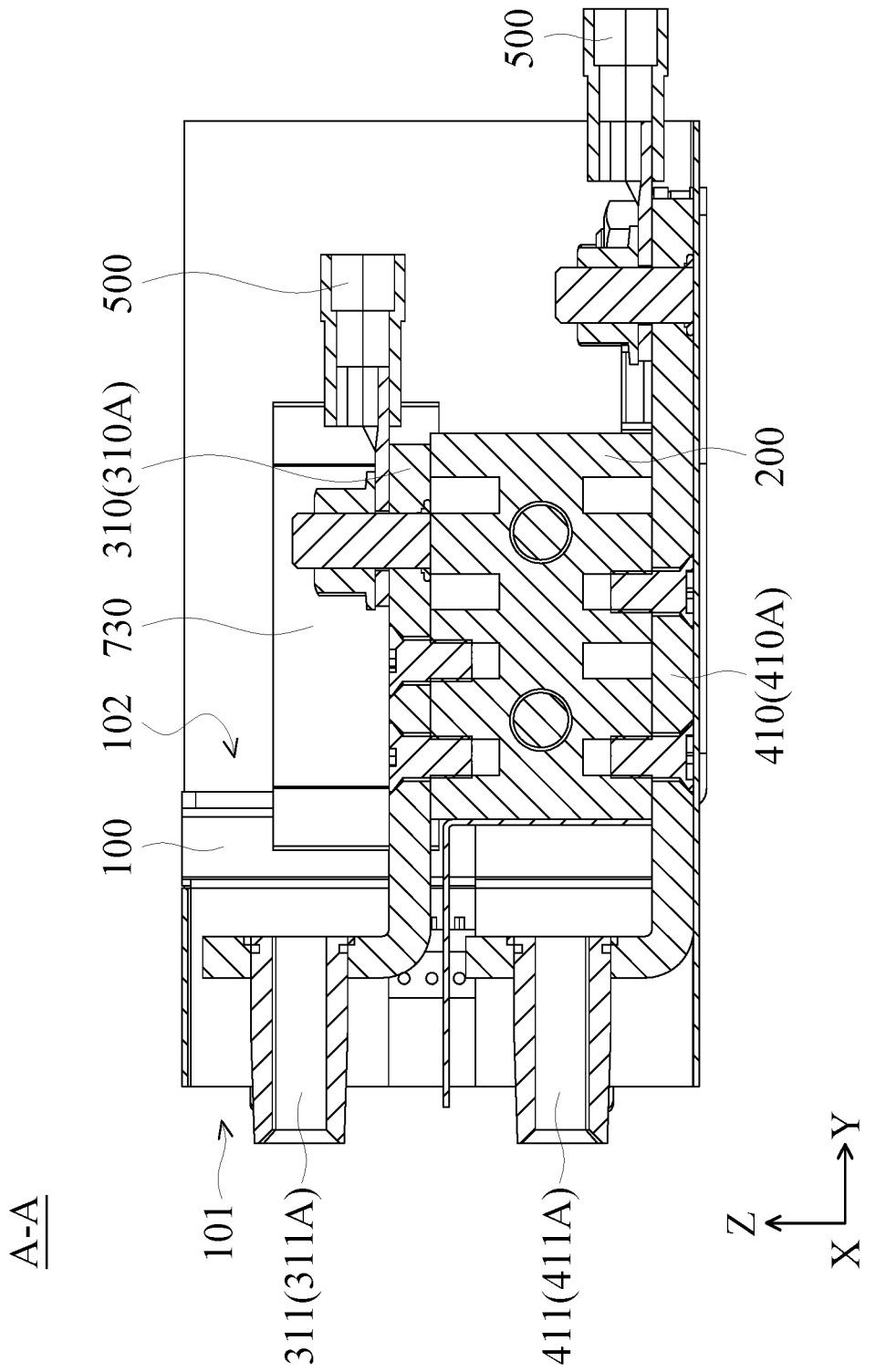
FIG. 5 is a cross-sectional view of a dotted line as observed from the direction A-A in FIG. 4.
Figure 6:
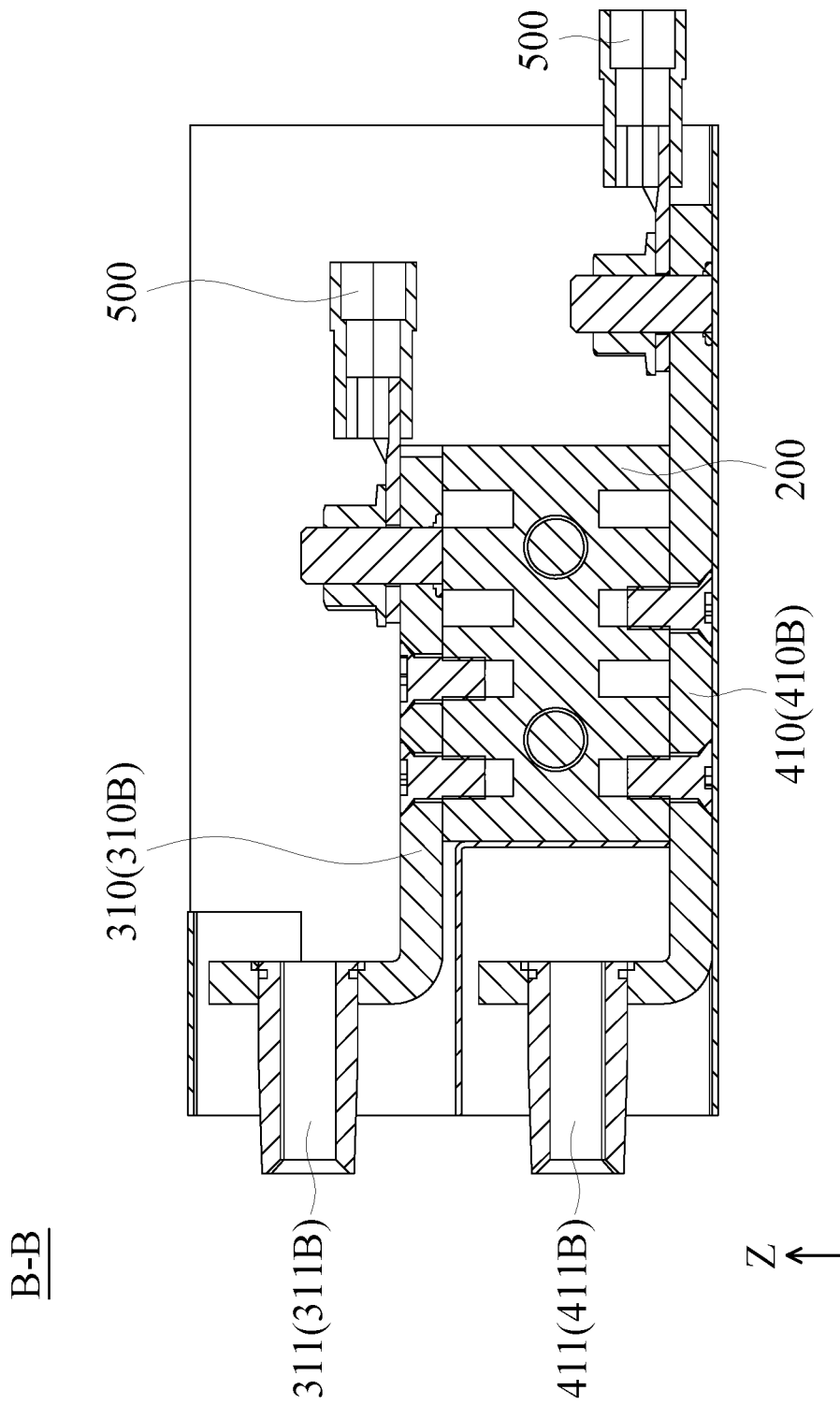
FIG. 6 is a cross-sectional view of a dotted line as observed from the direction B-B in FIG. 4.

FIG. 3 is an exploded diagram of the connecting device 23 in the power distribution panel 20, FIG. 4 is a top view of the connecting device 23, and FIG. 5 and FIG. 6 are cross-sectional views of dotted lines as observed from the direction A-A and the direction B-B in FIG. 4 respectively.

As shown in FIG. 2 to FIG. 6, the connecting device 23 primarily includes a bracket 100, a plurality of insulating clamps 200, a first power bus assembly 300, a second power bus assembly 400, a plurality of power conductors 500, a tripping detection module 600, a plurality of outer insulating members 710 and 720, and at least one inner insulating member 730.

The bracket 100 includes material with enough stiffness (such as plastic), and has a first side 101 and a second side 102 that are opposite to each other. The insulating clamps 200 are affixed to the bracket 100 at the second side 102, and the first power bus assembly 300 and the second power bus assembly 400 are affixed to the corresponding insulating clamps 200. Therefore, the first power bus assembly 300 and the second power bus assembly 400 can also disposed on the second side 102 of the bracket 100. Furthermore, the insulating clamps 200 can be disposed between the first power bus assembly 300 and the second power bus assembly 400 to separate them. In other words, the insulating clamps 200 can support and insulate the first power bus assembly 300 and the second power bus assembly 400 to prevent the short circuit. In some embodiments, the insulating clamps 200 support and insulate a plurality of power buses 310 in the first power bus assembly 300 and support and insulate a plurality of power buses 410 in the second power bus assembly 400, so as to ensure the structural strength and the electrical safety of the power distribution panel 200.

The first power bus assembly 300 includes a plurality of power buses 310. Each of the power buses 310 includes a terminal insertion port 311 on one end, and is electrically connected to the corresponding power conductor 500 on the other end. The terminal insertion port 311 is configured to allow the corresponding first input terminal 212 and the corresponding first output terminal 213 of the first electric apparatus safety device 21 to be inserted, forming an electrical connection between the first power bus assembly 300 and the first electric apparatus safety device 21. For example, referring to FIG. 4, in this embodiment, the first input terminal 212 of the first electric apparatus safety device 21 can insert into the terminal insertion port 311A of one power bus 310A, and the first output terminal 213 of the first electric apparatus safety device 21 can insert into the terminal insertion port 311B of another power bus 310B. The other end of each of the power conductors 500 can be electrically connected to the power module 10, thus, after the first input terminal 212 and the first output terminal 213 of the first electric apparatus safety device 21 are respectively inserted into the terminal insertion ports 311A and 311B of the power buses 310A and 310B, the electrical connection between the first electric apparatus safety device 21 and the power module 10 can be indirectly formed via the corresponding power conductors 500. When the first electric apparatus safety device 21 and the first power bus assembly 300 are assembled and connected, the first electric apparatus safety device 21 is situated at the first side 101 of the bracket 100. Since the power buses 310A and 310B of the first power bus assembly 300 are arranged along the first direction D1, the corresponding first input terminal 212 and the first output terminal 213 of each first electric apparatus safety device 21 are also arranged along the first direction D1.

The second power bus assembly 400 includes a plurality of power buses 410. Each of the power buses 410 includes a terminal insertion port 411 on one end, and is electrically connected to the corresponding power conductor 500 on the other end. The terminal insertion port 411 is configured to allow the corresponding second input terminal 222 and the corresponding second output terminal 223 of the second electric apparatus safety device 22 to be inserted, forming an electrical connection between the second power bus assembly 400 and the second electric apparatus safety device 22. For example, referring to FIG. 4, in this embodiment, the second input terminal 222 of the second electric apparatus safety device 22 can insert into the terminal insertion port 411A of one power bus 410A, and the second output terminal 223 of the second electric apparatus safety device 22 can insert into the terminal insertion port 411B of another power bus 410B. The other end of each of the power conductors 500 can be electrically connected to the power module 10, thus, after the corresponding second input terminal 222 and the corresponding second output terminal 223 of the second electric apparatus safety device 22 are respectively inserted into the terminal insertion ports 411A and 411B of the power buses 410A and 410B, the electrical connection can be indirectly formed between the second electric apparatus safety device 22 and the power module 10 via the corresponding power conductors 500. When the second electric apparatus safety device 22 and the second power bus assembly 400 are assembled and connected, the second electric apparatus safety device 22 is situated at the first side 101 of the bracket 100. Since the power buses 410A and 410B of the second power bus assembly 400 are arranged along the first direction D1, the corresponding second input terminal 222 and the second output terminal 223 of each second electric apparatus safety device 22 are also arranged along the first direction D1.

The tripping detection module 600 includes a circuit board 610 and a plurality of terminals 620. The circuit board 610 can be affixed to the bracket 100, and can be electrically connected to the control module 30. The terminals 620 can be disposed on the circuit board 610. When the first electric apparatus safety device 21 is electrically connected to the first power bus assembly 300 and/or the second electric apparatus safety device 22 is connected to the second power bus assembly 400, the electrical connecting terminal 214 of the first electric apparatus safety device 21 and/or the electrical connecting terminal 224 of the second electric apparatus safety device 22 can be in contact with and electrically connected to the terminals 620, so that the status of the electrical connection of the first electric apparatus safety device 21 and/or the second electric apparatus safety device 22 can be determined. That is, it can detect whether the first electric apparatus safety device 21 and the first power bus assembly 300 have been tripped, and detect whether the second electric apparatus safety device 22 and the second power bus assembly 400 have been tripped. The status of the electrical connection can be displayed on the display device of the control module 30 to inform the user.

The outer insulating members 710 and 720 and the inner insulating member 730 can be configured to prevent the short circuit between the power buses 310A, 310B, 410A, 410B. As shown in FIG. 2 to FIG. 4, in each of the connecting devices 23, the first power bus assembly 300 and the second power bus assembly 400 can be disposed in a space defined by the outer insulating members 710 and 720, so as to isolate from the external environment. Therefore, when the power distribution panels 20 are arranged along the first direction D1, the power buses 310 and 410 in each of the power distribution panels 20 are separated from and do not in contact with the power buses in the adjacent power distribution panel. The inner insulating member 730 can be disposed between the power buses 310A and 310B of the first power bus assembly 300, and between the power buses 410A and 410B of the second power bus assembly 400. The inner insulating member 730 is configured to separate the power buses 310A and 310B of the first power bus assembly 300, and separate the power buses 410A and 410B of the second power bus assembly 400.

As shown in FIG. 1, owing to the aforementioned structure of each power distribution panel 20, the power distribution panels 20 can be arranged along the direction D1 and horizontally stacked on the power module 10. In other words, the power module 10, the first electric apparatus safety devices 21 and the second electric apparatus safety devices 22 can be arranged along a second direction D2 in the space, and the second electric apparatus safety devices 22 can be disposed between the first electric apparatus safety devices 21 and the power module 10. The first input terminals 212 and the first output terminals 213 of the first electric apparatus safety devices 21 can be arranged along the first direction D1, the second input terminals 222 and the second output terminals 223 of the second electric apparatus safety devices 22 can be arranged along the first direction D1, and the first direction D1 is substantially perpendicular to the second direction D2. The second direction D2 is parallel to the directionality of the height of the power module 10 (the direction of the Z-axis in the figures), and is perpendicular to the first direction D1. Owing to the aforementioned disposition, the first input terminal 212 of each first electric apparatus safety device 21 and the second input terminal 222 of each corresponding second electric apparatus safety device 22 are arranged along the second direction D2 and form a plurality of input sides. The first output terminal 213 of each first electric apparatus safety device 21 and the second output terminal 223 of each corresponding second electric apparatus safety device 22 are arranged along the second direction D2 and form a plurality of output sides. The input sides and the output sides are arranged along the first direction D1, and as shown in the figures, the input sides and the output sides are arranged in a staggered manner. That is, they are arranged in the sequence of the input side, the output side, the input side, the output side . . . (INPUT, OUTPUT, INPUT, OUTPUT, . . . ). Therefore, the height of the assembled power system E can be reduced, the complexity of the cable management can be simplified, and the assembly space of the system can be efficiently used due to the stacked method of the first electric apparatus safety devices 21 and the second electric apparatus safety devices 22.

Figure 7:
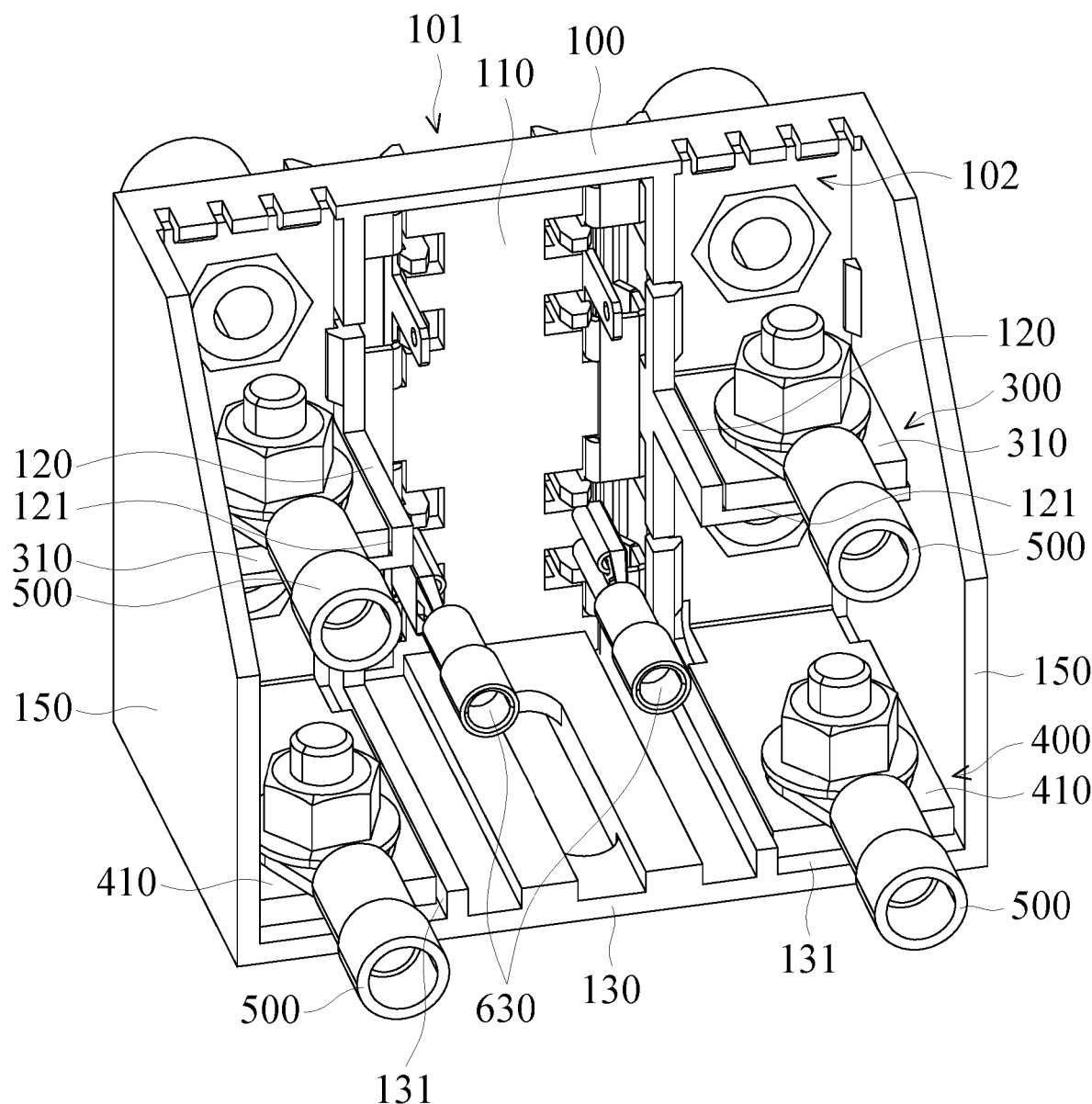
FIG. 7 is a schematic diagram of a connecting device according to another embodiment of the invention.
Figure 8:
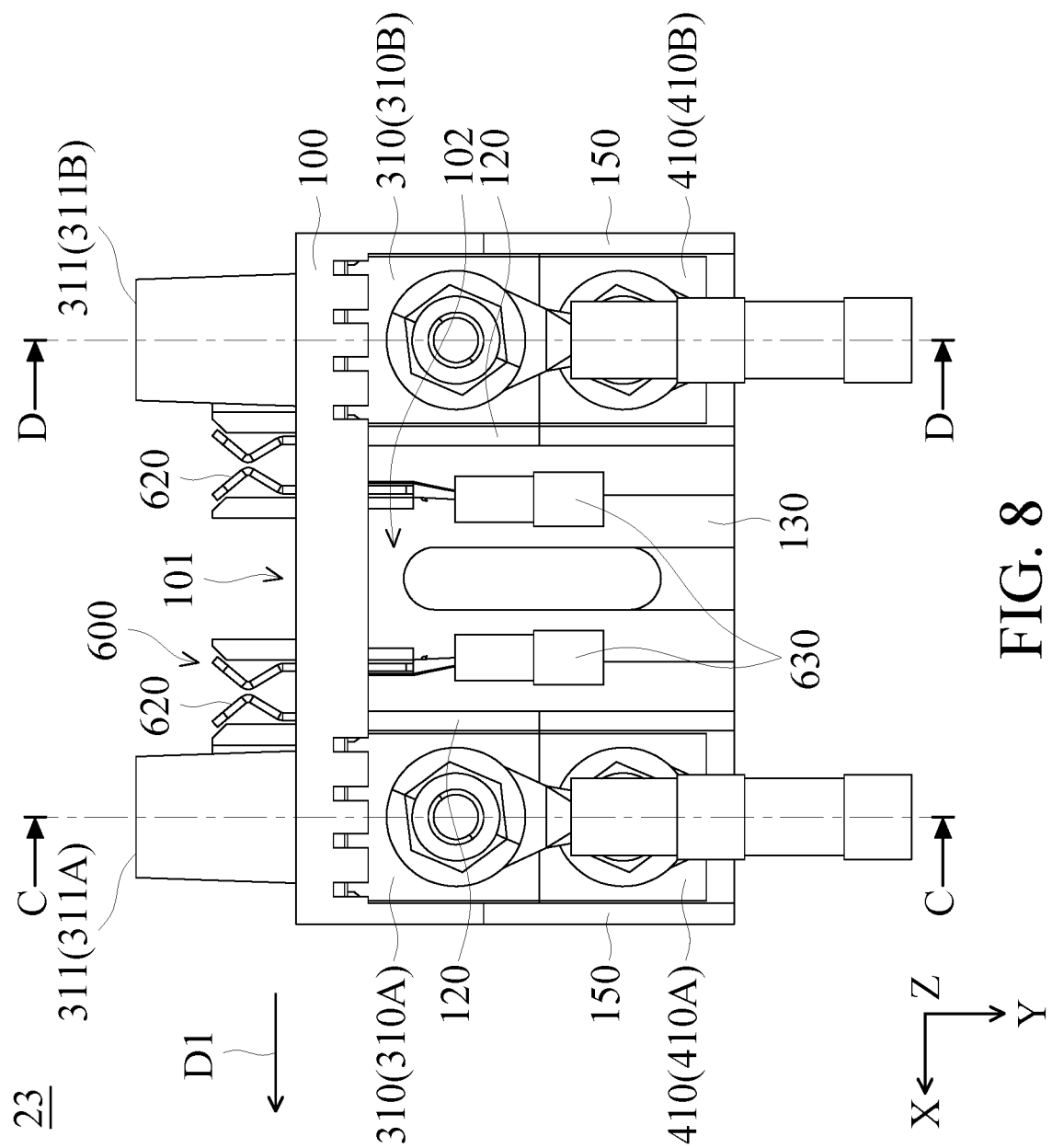
FIG. 8 is a top view of the connecting device according to another embodiment of the invention.
Figure 9:
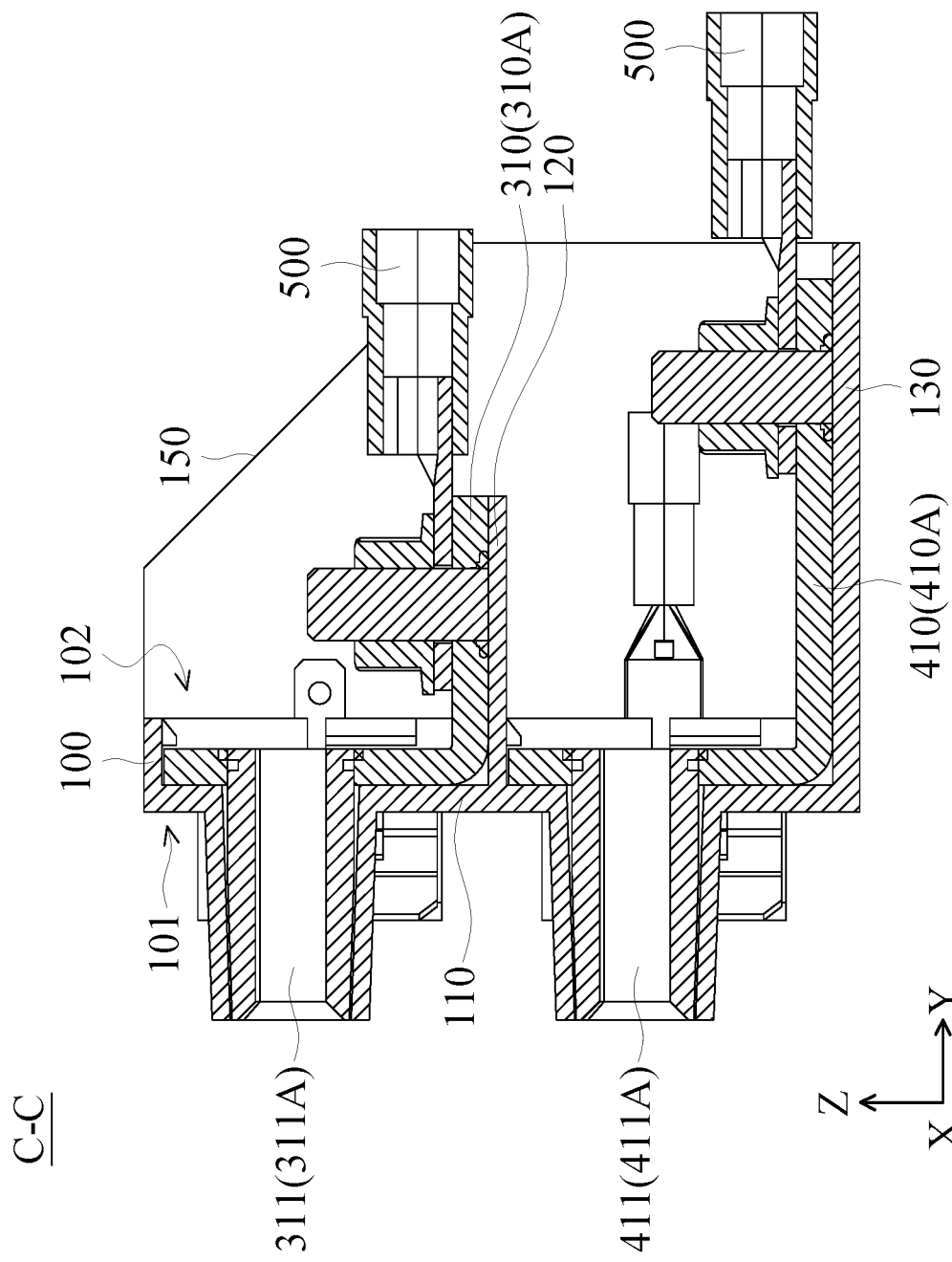
FIG. 9 is a cross-sectional view of a dotted line as observed from the direction C-C in FIG. 8.
Figure 10:
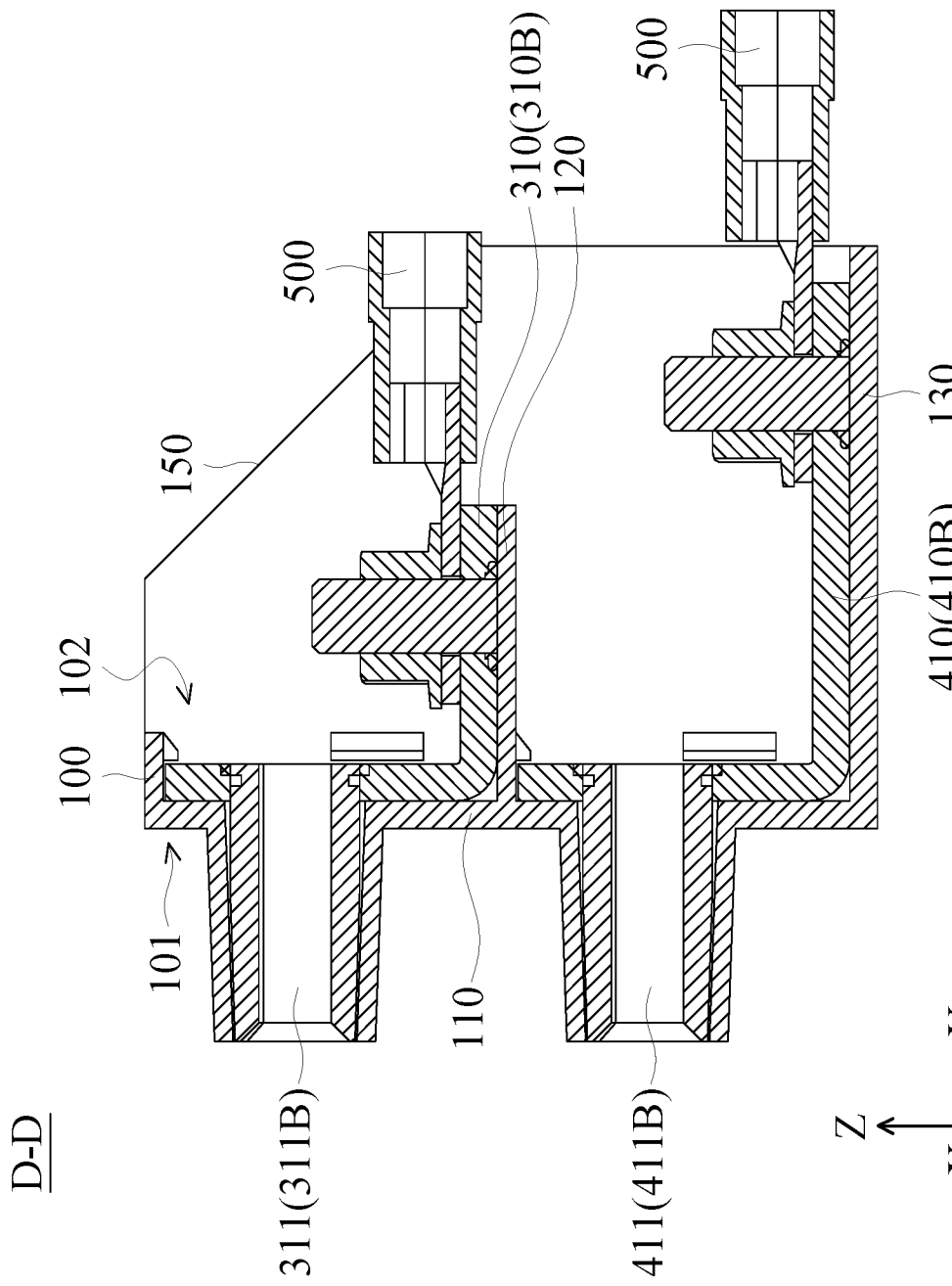
FIG. 10 is a cross-sectional view of a dotted line as observed from the direction D-D in FIG. 8.

FIG. 7 is a schematic diagram of a connecting device according to another embodiment of the invention. FIG. 8 is a top view of the connecting device according to another embodiment of the invention. FIG. 9 is a cross-sectional view of a dotted line as observed from the direction C-C in FIG. 8. FIG. 10 is a cross-sectional view of a dotted line as observed from the direction D-D in FIG. 8. Referring to FIG. 7 to FIG. 10, in another embodiment of invention, the connecting device 23 includes a bracket 100, a first power bus assembly 300, a second power bus assembly 400, a plurality of power conductors 500, and a tripping detection module 600.

The bracket 100 includes material with enough stiffness (such as plastic), and has a first side 101 and a second side 102 that are opposite to each other. In this embodiment, the bracket 100 includes a partition 110, a plurality of supporting portions 120, and a bottom plate 130. The partition 110 defines the first side 101 and the second side 102. The partition 110 is connected to the supporting portions 120 and the bottom plate 130 at the second side 102, and the supporting portions 120 and the bottom plate 130 are spaced away from each other. Each of the supporting portions 120 has a groove 121, and the appearance of each of the grooves 121 corresponds to the appearance of each of the power buses 310 of the first power bus assembly 300. A plurality of grooves 131 that are separated from each other are formed on the bottom plate 130. Similarly, the appearance of each of the grooves 131 corresponds to the appearance of each of the power buses 410 of the second power bus assembly 400. When the power buses 310 and the power buses 410 are respectively assembled on the corresponding supporting portions 120 and bottom plate 130, they can respectively accommodated in the corresponding grooves 121 and 131. Since their appearance correspond to each other, the power buses 310 and the power buses 410 can be positioned by the grooves 121 and 131. Moreover, the supporting portions 120 can be disposed between the first power bus assembly 300 and the second power bus assembly 400 to isolate them, so as to further prevent the short circuit. Furthermore, owing to the disposition of the grooves 121, the power buses 310A and 310B can be separated from each other. Owing to the disposition of the grooves 131, the power buses 410A and 410B can be separated from each other.

In this embodiment, the bracket 100 can further includes a plurality of lateral plates 150, and the first power bus assembly 300 and the second power bus assembly 400 can be disposed in a space defined by the lateral plates 150 to be isolated from the external environment. Therefore, when the power distribution panels 20 are arranged along the first direction D1, the power buses 310 and 410 in the two adjacent power distribution panels 20 can be separated by the lateral plates 150.

Each of the power buses 310 includes a terminal insertion port 311 on one end, and is electrically connected to the corresponding power conductor 500 on the other end. The terminal insertion port 311 is configured to allow the first input terminal 212 and the first output terminal 213 of the first electric apparatus safety device 21 to be inserted, forming an electrical connection between the first power bus assembly 300 and the first electric apparatus safety device 21. For example, in this embodiment, the first input terminal 212 of the first electric apparatus safety device 21 can insert into the terminal insertion port 311A of one power bus 310A, and the first output terminal 213 of the first electric apparatus safety device 21 can insert into the terminal insertion port 311B of another power bus 310B. The power conductors 500 can be electrically connected to the power module 10, thus, after the first input terminal 212 and the first output terminal 213 of the first electric apparatus safety device 21 are respectively inserted into the terminal insertion ports 311A and 311B of the power buses 310A and 310B, the electrical connection between the first electric apparatus safety device 21 and the power module 10 can be indirectly formed via the corresponding power conductors 500. When the first electric apparatus safety device 21 and the first power bus assembly 300 are connected, the first electric apparatus safety device 21 is situated at the first side 101 of the bracket 100, and the first power bus assembly 300 is situated at the second side 102 of the bracket 100. Since the power buses 310A and 310B of the first power bus assembly 300 are arranged along the first direction D1, the first input terminal 212 and the first output terminal 213 of the first electric apparatus safety device 21 are also arranged along the first direction D1.

Each of the power buses 410 includes a terminal insertion port 411 on one end, and is electrically connected to the corresponding power conductor 500 on the other end. The terminal insertion port 411 is configured to allow the second input terminal 222 and the second output terminal 223 of the second electric apparatus safety device 22 to be inserted, forming an electrical connection between the second power bus assembly 400 and the second electric apparatus safety device 22. For example, in this embodiment, the second input terminal 222 of the second electric apparatus safety device 22 can insert into the terminal insertion port 411A of one power bus 410A, and the second output terminal 223 of the second electric apparatus safety device 22 can insert into the terminal insertion port 411B of another power bus 410B. The power conductors 500 can be electrically connected to the power module 10, thus, after the second input terminal 222 and the second output terminal 223 of the second electric apparatus safety device 22 are respectively inserted into the terminal insertion ports 411A and 411B of the power buses 410A and 410B, the electrical connection between the second electric apparatus safety device 22 and the power module 10 can be indirectly formed via the corresponding power conductors 500. When the second electric apparatus safety device 22 and the second power bus assembly 400 are connected, the second electric apparatus safety device 22 is situated at the first side 101 of the bracket 100, and the second power bus assembly 400 is situated at the second side 102 of the bracket 100. Since the power buses 410A and 410B of the second power bus assembly 400 are arranged along the first direction D1, the second input terminal 222 and the second output terminal 223 of the second electric apparatus safety device 22 are also arranged along the first direction D1.

In this embodiment, the tripping detection module 600 includes a plurality of terminals 620 and a plurality of lines 630. The terminals 620 are affixed to the bracket 100. The lines 630 are connected to the terminals 620, and the lines 630 can also connected to the control module 30. When the first electric apparatus safety device 21 is electrically connected to the first power bus assembly 300 and/or the second electric apparatus safety device 22 is electrically connected to the second power bus assembly 400, the electrical connecting terminal 214 of the first electric apparatus safety device 21 and the electrical connecting terminal 224 of the second electric apparatus safety device 22 can be in contact with and connected to the terminals 620, so that the status of the electrical connection of the first electric apparatus safety device 21 and the second electric apparatus safety device 22 can be determined. That is, it can detect whether the first electric apparatus safety device 21 and the first power bus assembly 300 have been tripped, and detect whether the second electric apparatus safety device 22 and the second power bus assembly 400 have been tripped. The status of the connection can be displayed on the display device of the control module 30 to inform the user.

Figure 11:
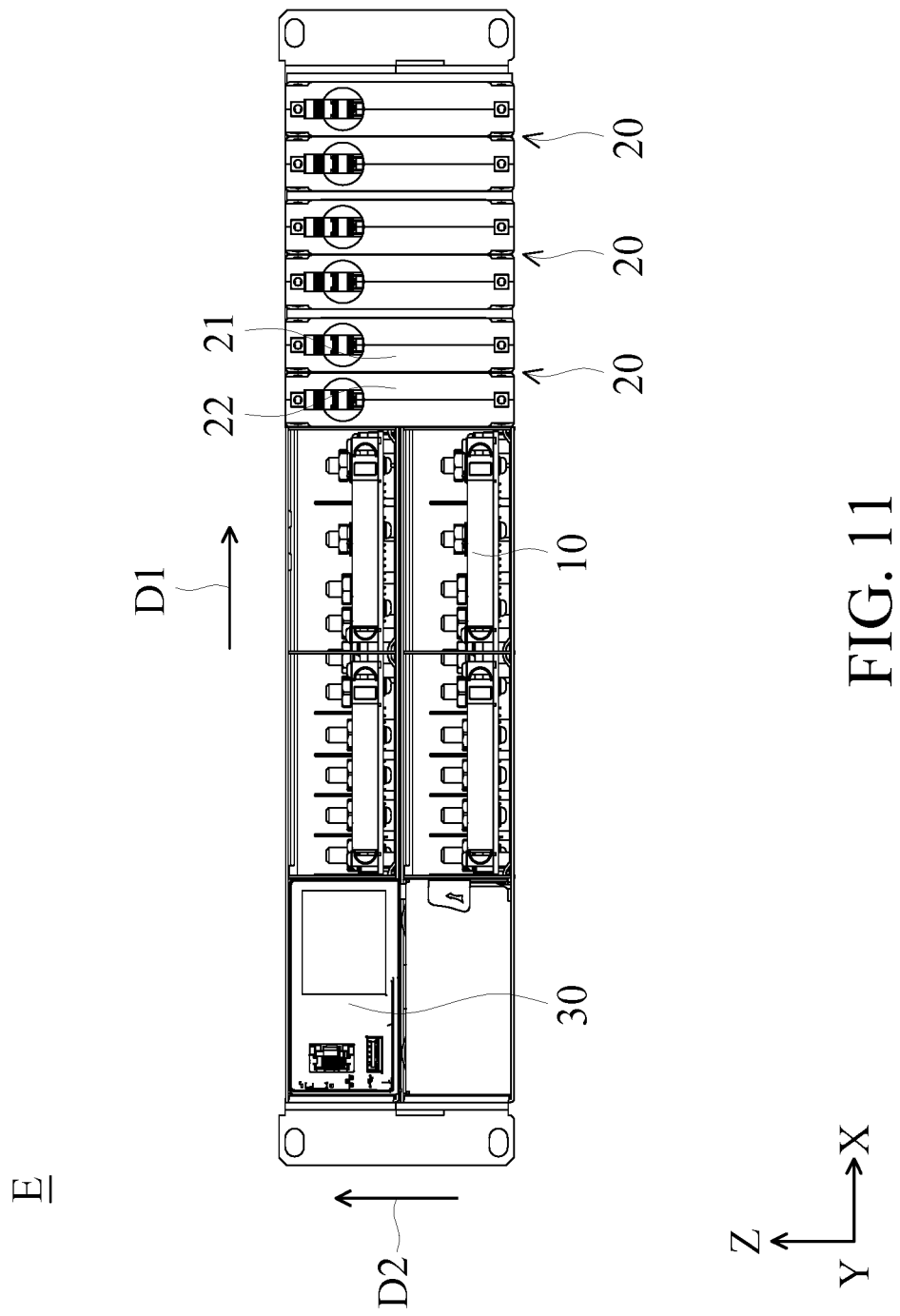
FIG. 11 is a schematic diagram of a power system according to another embodiment of the invention.
Figure 12:
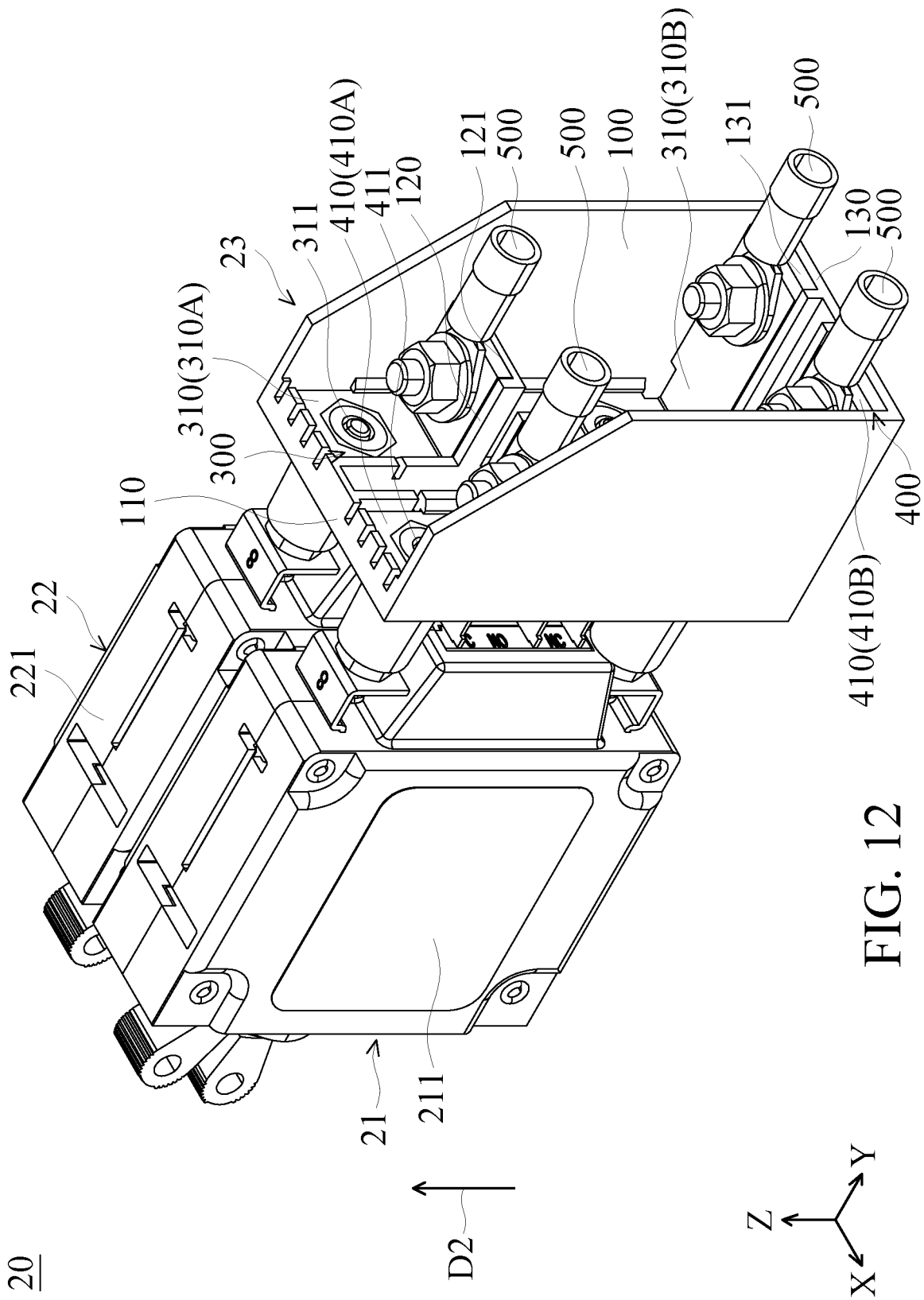
FIG. 12 is a schematic diagram of a power system according to another embodiment of the invention.

Referring to FIG. 11 and FIG. 12, in another embodiment of the invention, the connecting device 23 includes a bracket 100, a first power bus assembly 300, a second power bus assembly 400, and a plurality of power conductors 500. The bracket 100 includes a partition 110, a plurality of supporting portions 120, a bottom plate 130, and a plurality of lateral plates 150. The structure and the connecting relationship of the partition 110, the supporting portions 120, the bottom plate 130, and the lateral plates 150 are the same as the bracket 100 in FIG. 10, so that the features thereof are not repeated in the interest of brevity. The difference between this embodiment and the aforementioned embodiment is in that, the first electric apparatus safety device 21. The second electric apparatus safety device 22, and the power module 10 are arranged along the width direction of the power module 10 (the first direction D1 or the direction of the X-axis in the figures). In this embodiment, it takes three power distribution panels 20 as an example. The power distribution panels 20 are disposed on a side of the power module 10. The detail arrangement method is discussed in the following paragraphs.

The power bus assembly 300 includes a plurality of power buses 310. Each of the power buses 310 includes a terminal insertion port 311 on one end, and is electrically connected to the corresponding power conductor 500 on the other end. The terminal insertion port 311 is configured to allow the corresponding first input terminal 212 and the corresponding first output terminal 213 of the first electric apparatus safety device 21 to be inserted, forming an electrical connection between the first power bus assembly 300 and the first electric apparatus safety device 21. For example, in this embodiment, the first input terminal 212 of the first electric apparatus safety device 21 can insert into the terminal insertion port 311A of the power bus 310A, and the first output terminal 213 of the first electric apparatus safety device 21 can insert into the terminal insertion port 311B of the power bus 310B. In this embodiment, the power buses 310A and 310B can be respectively disposed in the groove 121 of the supporting portion 120 and the groove 131 of the bottom plate 130, so that the power buses 310A and 310B are arranged along the height direction of the power module 10 (the second direction D2 or the direction of the Z-axis in the figures). The second direction D2 is perpendicular to the first direction D1. That is, in this embodiment, when the first electric apparatus safety device 21 is electrically connected to the first power bus assembly 300, the first input terminal 212 and the first output terminal 213 of the first electric apparatus safety device 21 are also arrange along the second direction D2.

Similarly, the power bus assembly 400 includes a plurality of power buses 410. Each of the power buses 410 includes a terminal insertion port 411 on one end, and is electrically connected to the corresponding power conductor 500 on the other end. The terminal insertion port 411 is configured to allow the corresponding second input terminal 222 and the corresponding second output terminal 223 of the second electric apparatus safety device 22 to be inserted, forming an electrical connection between the second power bus assembly 400 and the second electric apparatus safety device 22. For example, in this embodiment, the second input terminal 222 of the second electric apparatus safety device 22 can insert into the terminal insertion port 411A of the power bus 410A, and the second output terminal 223 of the second electric apparatus safety device 22 can insert into the terminal insertion port 411B of the power bus 410B. In this embodiment, the power buses 410A and 410B can be respectively disposed in the groove 121 of the supporting portion 120 and the groove 131 of the bottom plate 130, so that the power buses 410A and 410B are arranged along the height direction of the power module 10 (the second direction D2). That is, in this embodiment, when the second electric apparatus safety device 22 is electrically connected to the second power bus assembly 400, the second input terminal 222 and the second output terminal 223 of the second electric apparatus safety device 22 are also arrange along the second direction D2.

Owing to the aforementioned disposition, the first input terminal 212 of each first electric apparatus safety device 21 and the second input terminal 222 of each corresponding second electric apparatus safety device 22 are arranged along the first direction D1 and form a plurality of input sides. The first output terminal 213 of each first electric apparatus safety device 21 and the second output terminal 223 of each corresponding second electric apparatus safety device 22 are arranged along the first direction D1 and form a plurality of output sides. The first direction D1 is the width direction of the power module 10 (the direction of the X-axis in the figures). The input sides and the output sides are arranged along the second direction D2. The second direction D2 is the height direction of the power module 10 (the direction of the Z-axis in the figures), and the second direction D2 is perpendicular to the first direction D1. Since the connecting device 23 in this embodiment can be disposed on the lateral side of the power module, the height of the assembled power system E can be further reduced, the complexity of the cable management can be simplified, and the assembly space of the system can be efficiently used due to the disposed method of the first electric apparatus safety devices 21 and the second electric apparatus safety devices 22.

In summary, an embodiment of the invention provides a power distribution panel and a power system including the power distribution panel. Owing to the modular design, the user can elastically arrange and/or replace the electric apparatus safety device as required, so that the expandability and the space utilization can be achieved. Moreover, the present disclosure has multiple isolating and supporting designs, the assembled strength and the electrical stability of the device can be confirmed.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A power system, comprising:
   a power module;
   a plurality of first electric apparatus safety devices, arranged along a first direction of the power system, wherein each of the first electric apparatus safety devices has a first input terminal and a first output terminal; and
   a plurality of second electric apparatus safety devices, arranged along the first direction, wherein each of the second electric apparatus safety devices has a second input terminal and a second output terminal;
   wherein the first electric apparatus safety devices and the second electric apparatus safety devices are stacked along a second direction of the power system, and the second direction is perpendicular to the first direction;
   wherein the second electric apparatus safety devices are disposed between the first electric apparatus safety devices and the power module;
   wherein the first input terminal of each of the first electric apparatus safety devices and the second input terminal of a corresponding one of the second electric apparatus safety devices are arranged along the second direction to form an input side;
   wherein the first output terminal of each of the first electric apparatus safety devices and the second output terminal of the corresponding one of the second electric apparatus safety devices are arranged along the second direction to form an output side; and
   wherein the input sides and the output sides are alternatively arranged along the first direction.

2. The power system as claimed in claim 1, further comprising a bracket, wherein a stacked pair of the first electric apparatus safety devices and the second electric apparatus safety devices are disposed on a first side of the bracket.

3. The power system as claimed in claim 2, further comprising:
   multiple sets of first power bus assemblies, connected to the first input terminals and the first output terminals of the first electric apparatus safety devices; and
   multiple sets of second power bus assemblies, connected to the second input terminals and the second output terminals of the second electric apparatus safety devices;
   wherein each set of the multiple sets of the first power bus assemblies and a respective set of the multiple sets of the second power bus assemblies are disposed on a second side of the bracket, and the second side is opposite to the first side.

4. The power system as claimed in claim 3, wherein the bracket further comprises a plurality of insulating clamps disposed between each set of the first power bus assemblies and the respective set of the second power bus assemblies to support and insulate each set of the first power bus assemblies and the respective set of the second power bus assemblies.

5. The power system as claimed in claim 3, wherein each power bus in the first power bus assemblies has a terminal insertion port configured to allow one of the first input terminal and the first output terminal to be inserted, and each power bus in the second power bus assemblies has a terminal insertion port configured to allow one of the second input terminal and the second output terminal to be inserted.

6. The power system as claimed in claim 3, further comprising a tripping detection module disposed on the bracket, and configured to detect whether the corresponding one of the first electric apparatus safety devices and the first power bus assemblies have been tripped and detect whether the corresponding one of the second electric apparatus safety devices and the second power bus assemblies have been tripped.

7. The power system as claimed in claim 3, wherein the bracket comprises a plurality of inner insulating members disposed between a set of power buses in the multiple sets of the first power bus assemblies and disposed between a set of power buses in the multiple sets of the second power bus assemblies.

8. The power system as claimed in claim 3, wherein the bracket comprises a plurality of outer insulating members or a plurality of lateral plates, the outer insulating members or the lateral plates define a plurality of spaces, and a set of the multiple sets of the first power bus assemblies and a set of the multiple sets of the second power bus assemblies are disposed in the spaces.

9. The power system as claimed in claim 3, wherein the bracket comprises:
   a plurality of supporting portions, configured to dispose a set of the multiple sets of the first power bus assemblies;
   a bottom plate, configured to dispose a set of the multiple sets of the second power bus assemblies; and
   a partition, connected to the bottom plate and the supporting portions, wherein the partition is disposed between the corresponding one of the first electric apparatus safety devices and a respective set of the multiple sets of the first power bus assemblies, and disposed between the corresponding one of the second electric apparatus safety devices and the respective set of the second power bus assemblies; wherein the supporting portions are separated from each other, and separate the respective set of the first power bus assemblies from the respective set of the second power bus assemblies.

10. The power system as claimed in claim 9, wherein the supporting portions have a plurality of grooves, wherein an appearance of the grooves of the supporting portions correspond to an appearance of the respective set of in the first power bus assemblies, and the bottom plate has a plurality of grooves, wherein an appearance of the grooves of the bottom plate correspond to the appearance of the respective set of in the second power bus assemblies.

11. The power system as claimed in claim 1, wherein the first direction is parallel to a height direction of the power module, and the second direction is parallel to a width direction of the power module; or the first direction is parallel to the width direction of the power module, and the second direction is parallel to the height direction of the power module.

* * * * *